Dec. 31, 1940.   E. G. CARROLL   2,227,245
BRAKE
Original Filed April 28, 1932
FIG. 1
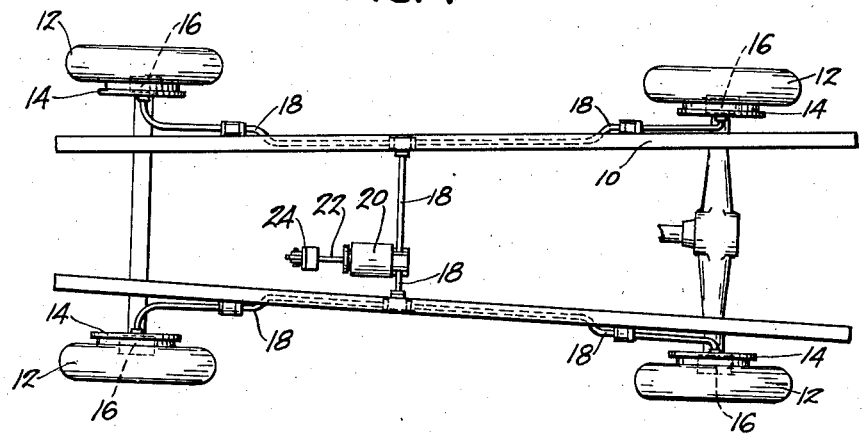
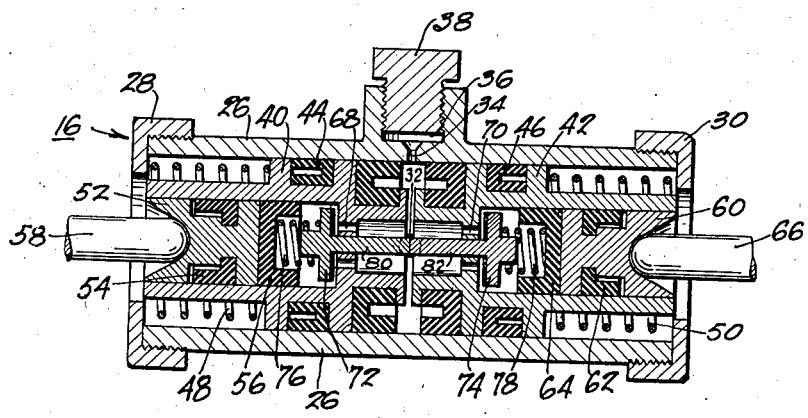
FIG. 2
INVENTOR.
EUGENE G. CARROLL
BY Jerome R. Cox
ATTORNEY.

Patented Dec. 31, 1940

2,227,245

UNITED STATES PATENT OFFICE 2,227,245

BRAKE

Eugene G. Carroll, Los Angeles, Calif., assignor to Bendix Aviation Corporation, South Bend, Ind., a corporation of Delaware Original application April 28, 1932, Serial No. 608,116, now Patent No. 2,170,851, dated August 29, 1939. Divided and this application October 12, 1938, Serial No. 234,565

14 Claims. (Cl. 188—152)

This application is a division of my copending application Serial No. 608,116, filed April 28, 1932 now Patent No. 2,170,851, Aug. 29, 1939.

This invention relates to brakes and more particularly to hydraulic braking systems.

One of the difficulties encountered in braking systems of all kinds, is the limitation of leverages obtainable. Leverages are limited by two factors. First they are limited by the fact that the brake shoes must be moved at least a certain distance determined by the minimum clearance allowable to prevent dragging of the brakes and the additional clearance developed through wear of the brakes. Second, the leverages are limited by the limitation of movement of the pedal on account of the space available within the vehicle and the comfort of the driver.

One of the objects of this invention is to increase the maximum leverages possible while retaining adequate movement of the shoes.

A feature of the invention is the provision of an improved form of two phase wheel cylinder, having the transfer from one phase to the other responsive to pressure developed in the system.

Further objects and features of the invention will be apparent after a reading of the subjoined specification and claims and after a consideration of the accompanying drawing, in which:

Figure 1 is a more or less diagrammatic view in plan of a chassis of an automobile equipped with a hydraulic brake system; and Figure 2 is a view in vertical section and on an enlarged scale of one of the wheel cylinders shown in Figure 1.

In Figure 1, I have shown an automobile chassis having a frame 10, supported on wheels 12. Each of the wheels 12 is provided with brakes 14 adapted to be moved into contact with the cooperating drums by wheel cylinders 16. A liquid is supplied to the wheel cylinders 16 through conduits 18 connected to a master cylinder 20. The master cylinder 20 is adapted to be operated through a piston rod 22 by a pedal 24.

Each of the wheel cylinders 16 comprises a cylindrical casting 26 provided at its ends with caps 28 and 30 which are securely screwed onto the ends of the casting. The cylinder is formed with an inlet opening 32 connected with its associated conduit 18 and with an outlet opening 34 leading to a tapped recess 36 normally closed by a plug 38.

Positioned within the cylinders are a pair of annular pistons 40 and 42 provided with annular rubber cups 44 and 46 respectively. Interposed between the annular piston 40 and the cap 28 is a spring 48 and interposed between the piston 42 and the cap 30 is a spring 50, these springs serving to maintain the pistons normally in their innermost positions. Within the annular piston 40 there is slidably mounted a central piston 52 provided with a cup packing 54 for preventing the ingress of fluid past the piston and provided with a cup packing 56 for preventing the exit of fluid past the piston.

A piston rod 58 transmits motion from the piston 52 to the brake shoe. On the opposite side of the cylinder there is provided a similar central piston 60 provided with cup packings 62 and 64 and having associated therewith a piston rod 66. Central openings through the inner ends of the pistons 40 and 42 are partially closed but are provided with openings such as 68 and 70. These openings are at times closed by check valves 72 and 74, the valves being urged toward their seats by springs 76 and 78 and being provided with stems 80 and 82 which contact with each other and normally prevent the valves from resting upon their seats.

When fluid is supplied to the cylinder 16 through the inlet 32, it passes through the openings 68 and 70 and acting against the pistons 52 and 60 forces the rods 58 and 66 outward, thus moving the brake shoes into contact with the brake drums. The forces of the springs 48 and 50 hold the pistons 40 and 42 in their normal inward position. However, as soon as sufficient resistance to movement of the brake shoes and the pistons 52 and 60 is developed, pressure in the fluid rises sufficiently to overcome the springs 48 and 50 and the fluid acts to move the large pistons 40 and 42. As soon as the pistons 40 and 42 begin to move, the springs 76 and 78 close the valves 72 and 74 and the liquid trapped between said valves and their corresponding pistons 52 and 60 forms a substantially solid link between the annular pistons and their corresponding central pistons. Thereupon fluid pressure acts upon the large pistons to apply the shoes to the drums at much higher pressures.

When pressure on the fluid is released by the release of the pedal 24, the large pistons 40 and 42 return first to their normal position, thus causing the stems 80 and 82 to contact and to move the valves 72 and 74 from their seats whereupon liquid trapped behind the valves is allowed to escape and the pistons 52 and 60 are allowed to return to their normal positions shown.

It is to be understood that the above described embodiment of my invention is for the purpose of illustration only and various changes may be made therein without departing from the spirit and scope of the invention.

I claim:

1. In a hydraulic brake system, a master cylinder, a wheel cylinder, connections between said master cylinder and said wheel cylinder, means in said wheel cylinder for converting hydraulic pressure produced by said master cylinder into brake applying force, and additional means in said wheel cylinder responsive to a predetermined increased resistance to brake application for converting the hydraulic pressure into brake applying force at a higher ratio.

2. In a hydraulic brake system, a master cylinder, a wheel cylinder, connections between said master cylinder and said wheel cylinder, means comprising a piston in said wheel cylinder for converting hydraulic pressure produced by said master cylinder into brake applying force, and additional means responsive to a predetermined increased resistance to brake application and comprising a second piston in said wheel cylinder having a larger pressure receiving area for converting the hydraulic pressure into brake applying force at a higher ratio.

3. In a hydraulic brake system, a master cylinder, a wheel cylinder, connections between said master cylinder and said wheel cylinder, means comprising a piston in said wheel cylinder for converting hydraulic pressure produced by said master cylinder into brake applying force, and additional means responsive to a predetermined increased resistance to brake application and comprising a second piston surrounding the first for converting the hydraulic pressure into brake applying force at a higher ratio.

4. In a hydraulic brake system, a master cylinder, a wheel cylinder, connections between said master cylinder and said wheel cylinder, means in said wheel cylinder for converting hydraulic pressure produced by said master cylinder into brake applying force, and additional means responsive to a predetermined increased resistance to brake application for converting the hydraulic pressure into brake applying force at a higher ratio, said converting means comprising a pair of pistons in each end of said wheel cylinder.

5. In a hydraulic brake system, a master cylinder, a wheel cylinder, connections between said master cylinder and said wheel cylinder, means comprising a piston in said wheel cylinder for converting hydraulic pressure produced by said master cylinder into brake applying force, and additional means responsive to a predetermined increased resistance to brake application and comprising a second piston in said wheel cylinder and a spring acting thereon for converting the hydraulic pressure into brake applying force at a higher ratio.

6. In a hydraulic brake system, a master cylinder, a wheel cylinder; connections between said master cylinder and said wheel cylinder; means in said wheel cylinder for converting hydraulic pressure produced by said master cylinder into brake applying force; and additional means responsive to a predetermined increased resistance to brake application for converting the hydraulic pressure into brake applying force at a higher ratio; said two converting means comprising a pair of pistons in each end of said wheel cylinder, a check valve associated with one of the pistons in each end, and a rod for each of the valves adapted to contact with the other rod for unseating the valves when the pistons are in their normal released position.

7. In a hydraulic brake system, a master cylinder, a wheel cylinder, connections between said master cylinder and said wheel cylinder, means in said wheel cylinder for converting hydraulic pressure produced by said master cylinder into brake applying force, and additional means in said wheel cylinder responsive to a predetermined increased resistance to brake application for converting the hydraulic pressure into brake applying force at a higher ratio, said two converting means comprising a pair of pistons, and a one-way check valve associated with one of said pistons.

8. In a hydraulic brake system, a wheel cylinder, a pair of concentric pistons in each end of said cylinder, the outer piston having a central opening leading to the inner piston, a valve associated with the outer piston and closing the opening leading to the inner piston, means for resiliently urging said valve toward its seat, and a spring bearing upon said outer piston for holding it substantially stationary until hydraulic pressure in said cylinder exceeds the pressure necessary to apply the brake initially.

9. In a hydraulic brake system, a master cylinder, a wheel cylinder, a conduit forming a connection between said master cylinder and said wheel cylinder, means in said wheel cylinder for converting hydraulic pressure produced by said master cylinder into brake applying force, and additional means in said wheel cylinder responsive to a predetermined increased resistance to brake application for converting the hydraulic pressure into brake applying force at a higher ratio.

10. In a hydraulic brake system, a master cylinder, a wheel cylinder, a flexible conduit forming a connection between said master cylinder and said wheel cylinder, means comprising a piston in said wheel cylinder for converting hydraulic pressure produced by said master cylinder into brake applying force, and additional means responsive to a predetermined increased resistance to brake application and comprising a second piston in said wheel cylinder having a larger pressure receiving area for converting the hydraulic pressure into brake applying force at a higher ratio.

11. A fluid brake system comprising a master cylinder, a wheel cylinder, connections between said cylinders for conducting fluid from one cylinder to the other, and means associated with said wheel cylinder for causing fluid conducted thereto to act during one phase of the brake applying cycle on a larger effective brake actuating area in said wheel cylinder than during a different phase of said cycle.

12. A fluid brake system comprising a master cylinder, a wheel cylinder, connections between said cylinders for conducting fluid from one cylinder to the other, and means responsive to the development of a predetermined pressure in the fluid conducted to said wheel cylinder for causing the fluid to act during one phase of the brake applying cycle on a larger effective brake actuating area in said wheel cylinder than during another phase of said cycle.

13. A fluid brake system comprising a master cylinder, a wheel cylinder, connections between said cylinders for conducting fluid from one cylinder to the other, and means associated with said wheel cylinder for causing fluid conducted thereto to act during a later phase of the brake applying cycle on a larger effective brake actuating area in said wheel cylinder than during an earlier phase of said cycle.

14. A fluid brake system comprising a drum, a friction element, a master cylinder, a wheel cylinder, connections between said cylinders for conducting fluid from said master cylinder to said wheel cylinder to apply said friction element to said drum, and means associated with said wheel cylinder for causing fluid conducted thereto to act after the friction element has contacted with the drum on a larger effective brake applying area in said wheel cylinder than before said contact.

EUGENE G. CARROLL.